United States Patent [19]
Lorensen et al.

[11] Patent Number: 5,611,025
[45] Date of Patent: Mar. 11, 1997

[54] VIRTUAL INTERNAL CAVITY INSPECTION SYSTEM

[75] Inventors: William E. Lorensen, Ballston Lake, N.Y.; Ferenc A. Jolesz; Ron Kikinis, both of Brookline, Mass.

[73] Assignee: General Electric Company, Schenectady, N.Y.

[21] Appl. No.: 344,445

[22] Filed: Nov. 23, 1994

[51] Int. Cl.$^6$ ............................................. A61B 8/13
[52] U.S. Cl. ............................................. 395/119
[58] Field of Search ............................. 395/119, 120, 395/124, 152; 128/653.1, 653.2, 660.01; 434/262; 364/413.13, 413.14

[56] References Cited

U.S. PATENT DOCUMENTS

| | | | |
|---|---|---|---|
| 4,710,876 | 12/1987 | Lorensen | 364/414 |
| 4,719,585 | 1/1988 | Lorensen | 364/518 |
| 4,751,643 | 6/1988 | Lorensen | 364/414 |
| 4,907,973 | 3/1990 | Hon | 434/262 |
| 5,175,773 | 12/1992 | Garreau et al. | 382/130 |
| 5,187,658 | 2/1993 | Lorensen | 364/413.13 |
| 5,233,687 | 8/1993 | Henderson, Jr. et al. | 395/158 |
| 5,313,567 | 5/1994 | Civanlar | 395/124 |
| 5,347,459 | 9/1994 | Greenspan et al. | 395/124 X |
| 5,412,763 | 5/1995 | Knoplioch et al. | 395/124 |
| 5,425,139 | 6/1995 | Williams et al. | 395/152 |

OTHER PUBLICATIONS

H. Rheingold, *Virtual Reality*, 31–33, 112 (1991).
Higgins et al, *Toward Dynamic Visualization for Endoscopy Simulation*, Proceedings of the 16th Annual International Conference of the IEEE Engineering in Medicine and Biology Society, 3–6 Nov. 94 (Abstract Only).
R. Wood et al, Stereoendoscopy Gives Surgeons Normal Vision, Photonics Spectra, v27 n9, p40(2), Sep. 1993.
Higgins, "Towards Dynamic Visualization for Endoscopy Simulation," Proceeding of the 16th International Conference on the IEEE Engineering in Medicine and Biology, pp. 700–701 Nov. 6, 1994.

*Primary Examiner*—Mark K. Zimmerman
*Assistant Examiner*—Anton W. Fetting
*Attorney, Agent, or Firm*—Lawrence P. Zale; Marvin Snyder

[57] ABSTRACT

A virtual internal cavity inspection system non-invasively provides images of cavities of a subject from a viewpoint within the cavity. An acquisition unit acquires imaging information about internal structures of a subject. This imaging information is segmented into separate structures, and a 3D surface model is constructed. An operator views an image of the 3D model to select a goal viewpoint and a start viewpoint. A viewpoint path is created linking the start viewpoint and the goal viewpoint. Images are created with a viewpoints along the viewpoint path. A variety of additional visualization techniques aid the viewer's localization of the current image viewpoint, and its relation to the subject.

7 Claims, 3 Drawing Sheets

VIRTUAL INTERNAL CAVITY INSPECTION SYSTEM

CROSS REFERENCE TO RELATED APPLICATIONS

This application is related to U.S. patent applications Ser. No. 07/815,772 filed Jan. 2, 1992 "A Method for Reducing the Complexity of a Polygonal Mesh" by Jonathan A. Zarge and William J. Schroeder; and Ser. No. 08/144,270 filed Oct. 28, 1993 "Geometric Clipping Using Boolean Textures" by William E. Lorensen ("Texture Mapping"); both assigned to the present assignee.

BACKGROUND OF THE INVENTION

1. Field of the Invention

The present invention relates to visualization of passages within a solid body and more specifically to non-invasively simulating views from within passages from imaging data.

2. Description of Related Art

It is sometimes necessary to obtain views of passages which run through solid subjects, from a viewpoint within the passage. In the case of the subject being a patient, it is necessary to view blockage or structures in the colon, intestines, bronchi, arteries etc. An endoscope is such a device which provides real-time, high resolution views of the interior of hollow organs and cavities that exist within the human body. Although an endoscopic examination is mostly non-invasive, the procedures still require some sedation or anesthesia to reduce patient discomfort.

The use of internal viewing devices similar to the endoscope may be used in non-medical settings to view the passages within a solid structure. Some of these do not allow internal views since the passage or cavity may not have an opening to the outside, or that it there is a continuous opening to the outside, it may not be large enough to accept the internal viewing device.

Another problem with the internal viewing devices is that the field of view is limited to a small area inside of the passageway. It is very difficult to determine the exact position within the subject to correlate the image from the internal imaging device with gross structures of the subject.

To determine the position within the subject, X-Ray Computed Tomography (CT) and Magnetic Resonance Imaging (MRI) have been used to display internal anatomy of the subject. These methods are non-destructive/non-invasive imaging techniques. Typically these have been used to supplement the images provided by the internal imaging device to try to correlate the image being viewed with a location within the subject.

In a medical setting, a radiologist typically views a two-dimensional (2D) cross sections and create a mental image of the 3D structures and correlate the images from within the passages to its 3D location within the subject. However, when the subject has a complex internal structures, such as tubular structures in the body which pass back and forth repeatedly through the cross sections.

Currently, there is a need for a device which can non-invasively display images of internal passages of a solid body along with a representation of where within the subject the view is being acquired.

OBJECTS OF THE INVENTION

An object of the present invention is to provide a display system that non-invasively provides images of cavities within a subject along with an image identifying the viewpoint of the internal image in relation to the overall subject.

Another object of the present invention is to provide a system which enables an operator to view structures and surfaces within a cavity of a subject having no opening to the outside of the subject.

SUMMARY OF THE INVENTION

The present invention provides both types of views, internal 'virtual endoscope' views, and gross overall view indicating the endoscope's instantaneous position.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

FIG. 2 is an illustration of two-dimensional (2D) distance labeling for use with path planning of the present invention.

FIG. 3 is an illustration of path planning according to an embodiment of the present invention.

DETAILED DESCRIPTION OF THE INVENTION

The present invention allows visualization of passages internal to a subject, and exploration of surfaces and structures within these passages.

Figure 1:
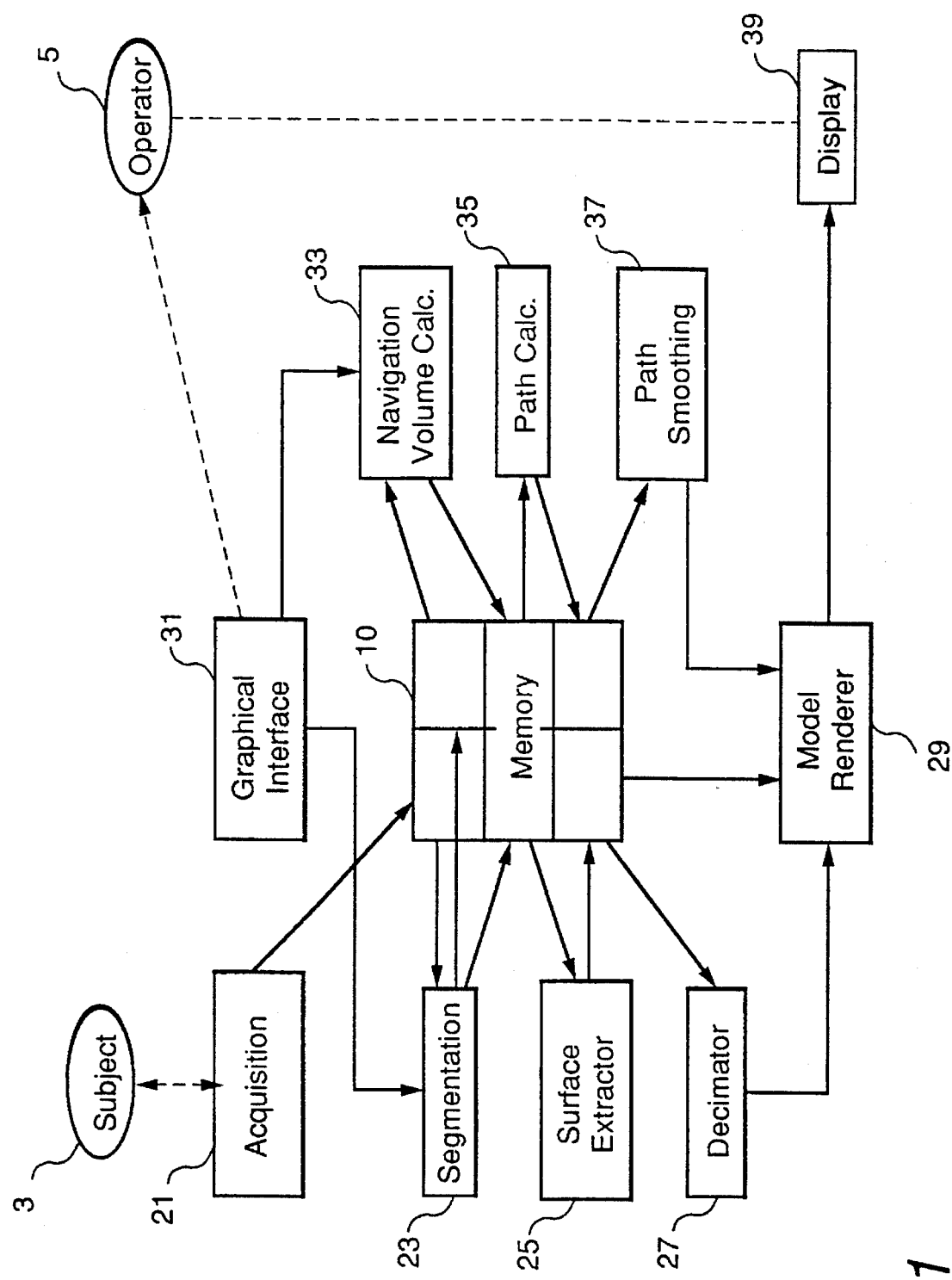
FIG. 1 is a simplified block diagram of the system of the invention.

In FIG. 1, a virtual cavity inspection system according to the present invention is shown comprising several subsystems:

1. an image acquisition unit 21 capable of non-invasively producing imaging information of internal structures of a subject. This may be X-ray Computed Tomography (X-ray-CT) and Magnetic Resonance Imaging (MRI), or ultrasound systems;
2. a segmentation unit 23 identifies tissues of interest within a volume described by the imaging information;
3. a surface extractor 25 that builds polygonal models of each selected tissue;
4. a model renderer 29 capable of transforming and manipulating a polygonal data set;
5. a functionally partitioned memory for storing imaging information; and
6. optionally, a path finder subsystem 35 that calculates a "safe" trajectory through an organ selected by the user.

Image Acquisition

X-ray, computed tomography (CT), magnetic resonance imaging (MRI) or ultrasound systems may be used as acquisition unit 21 to acquire multi-dimensional imaging information relating to internal structures of a subject 3. This information may be acquired at some previous time and stored in a memory 10, or may be acquired interactively as needed. Memory 10 is functionally sectioned such that various types of information may be independently stored and retrieved without disrupting other information stored in memory 10.

Segmentation

The imaging information stored in memory 10 is provided to a segmentation unit 23 which analyzes the imaging information and determines contiguous locations having the same type of tissue, and identifies all these locations as an organ. This segments the information, by location, into identifiable solid structures. Conventional segmentation methods may be used here. A segmentation technique compatible with the present invention is described in U.S. Pat. No. 4,751,643 issued Jun. 14, 1988 "Method and Apparatus for Determining Connected Substructures Within a Body" by W. Lorensen, H. Cline. A second method which may be used is described in U.S. Pat. No. 5,187,658 issued Feb. 16, 1993 "System and Method for Segmenting Internal Structures Contained Within The Interior Region of a Solid Object" by H. Cline, W. Lorensen, both assigned to the present assignee and hereby incorporated by reference.

Surface Extractor

Once the voxels of the image information are segmented, labeled with tissue/organ identifiers, surface models may be generated from volume data from imaging unit 21 by surface extractor 25 employing conventional techniques such as the marching cubes algorithm described in U.S. Pat. No. 4,710,876, issued Dec. 1, 1987 "System and Method for the Display of Surface Structures Contained Within the Interior Region of a Solid Body" by Harvey E. Cline and William E. Lorensen ("Marching Cubes method") assigned to the present assignee and hereby incorporated by reference.

The Marching Cubes method locates surface points of an identified tissue using linear interpolation to locate the tissue boundary within a "cube" defined by eight neighboring voxels. A unit vector normal to the surface is also derived for each triangle vertex from the gradient of the voxel data. For the endoscopic application, a surface defined by triangles is preferred over points or direct volume renderings, because re-interpolation of the volume data is too computationally expensive for the desired interactive rendering speeds.

Because a large numbers of triangles are often required to model the surfaces, the number of triangles is reduced in relatively flat portions of the surface by a decimator 27. Decimator 27 may employ many different known decimation methods, such as "Decimation application" by Zarge, Schroeder cited in the "Cross Reference to Related Applications" above. The decimated surface improves rendering speeds with only a minor loss of detail.

Another method of displaying models is described in U.S. Pat. No. 4,719,585, issued Jan. 12, 1988, "Dividing Cubes System and Method for the Display of Surface Structures Contained Within the Interior Region of a Solid Body" by Harvey E. Cline, Siegwalt Ludke, and William E. Lorensen, ("Dividing Cubes ") assigned to the present assignee and incorporated by reference. The method begins with volume data and creates a surface described by a number of point and normal vectors associated with each point, rather than polygons. The "dividing cubes" method has been used to display surfaces contained within volumetric data.

Decimation may not be used for displays that require a regularly spaced information, such as point and normal displays.

The decimated image information from decimator 27 describes a three-dimensional (3D) surface model and is stored in memory 10. A model renderer 29 creates a image of the 3D surface model as viewed from a selected viewpoint. Renderer 29 may be constructed according to conventional computer graphic rendering designs.

Virtual Camera Viewpoint

The present invention may employ any of three approaches to select an image viewpoint of the 3D surface model, or a series of image viewpoints, which collectively will be referred to as a viewpoint path.

In the first approach, an operator controls the image viewpoint with a graphical interface 31, such as a computer mouse. Graphical interface 31 permits the movement of the image viewpoint. Operator 5 may also control the field of view and other imaging parameters of renderer 29 with graphical interface 31. This manual technique is best suited for applications like surgical planning and surgical simulation.

A second approach employs a computer animation technique called key framing. Renderer 29 provides an image of internal structures of subject 3 also indicating internal passages. Operator 5 employs a graphical interface 31, to select different viewpoints to view an image, known as 'key' frames. Once the key frames have been established, a path smoothing unit 37 generates a smooth path linking the key frames. Known smoothing techniques, such as cubic splines, can be used. A virtual movie may be played back by renderer 29 by successively producing images from viewpoints along the smoothed path. This give the impression to the operator of moving a virtual camera along the path. Keyframing is suitable for gross camera movements through open interior and exterior environments.

Path Planning

Traversing hollow organs that operator 5 wishes to explore present a challenge for the first and second approaches above. Manual viewpoint movement in confined spaces is difficult. A technique similar to robot path planning is employed in selecting viewpoints for images in tight spaces.

This approach automatically finds a path through a passage. Operator 5 employs graphical interface 31 to specify a 3D location being a final goal for the image viewpoint.

Figures 2, 3:
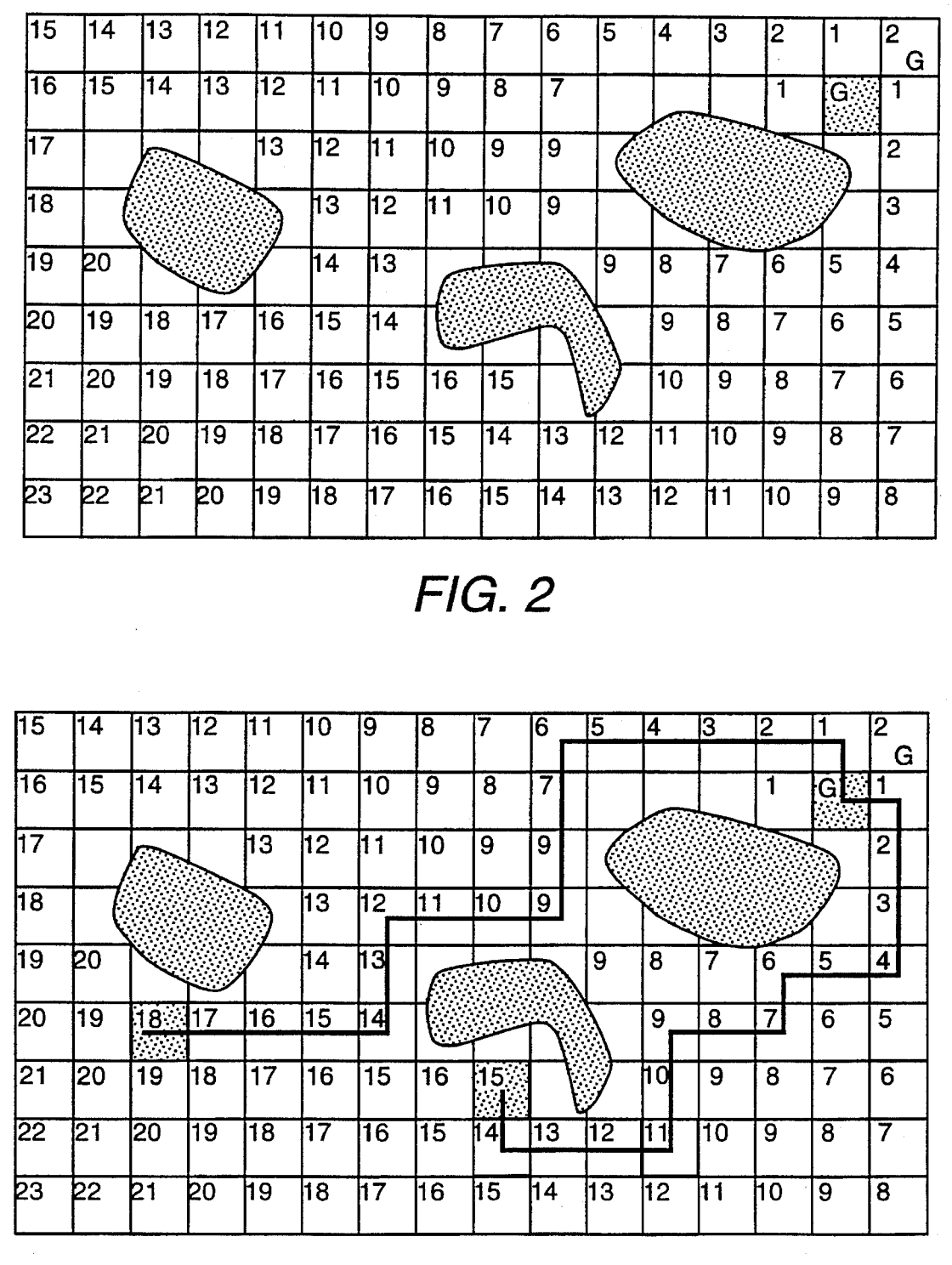

A navigation volume calculation unit 33 labels all voxels with its distance to the goal. FIG. 2 shows a 2D representation of distance labeling for a single slice. The goal is point G. The implementation of FIG. 2 employs a wavefront propagation technique across voxels. Distances are determined on a grid such as manhattan (city block) distance for efficiency. Each voxel in the navigation volume which are not part of an "obstacle" is labeled with an integer distance to the goal. Voxels containing obstacles are not labeled. This is repeated for all neighbor voxels which have not been processed, resulting in processing of a 'wavefront'. The distance labeling terminates when no new neighbors of the wavefront can be labeled.

Once the navigation volume is created, slices of the segmented model may be displayed as though they were anatomical slices.

Operator 5 also selects a start point. A proposed viewpoint path from the selected start point in the volume to the goal is calculated by a path calculation unit 35 by conventional methods, preferably using a steepest descent technique on the values of navigation volume stored in memory 10. Path calculation unit 35 may also calculate a distance from each start point to the goal point and display it to operator 5. FIG. 3 shows calculated paths from two start points.

A path smoothing unit 37 calculates a smooth flight path linking selected path points between the start point and the goal employing conventional smoothing techniques. Because the path calculation unit 35 generates small steps as it moves towards the goal, the number of points on the viewpoint path are typically reduced by a factor of two or three before smoothing them.

Once the viewpoint path is generated, operator 5 can start, stop and step along the calculated viewpoint path by appropriate signals sent to renderer 29.

Display—Rendering

Renderer 29 may also employ several different display alternatives.
1. Single 3D image—Surface rendering of internal structures of subject 3 can be rendered using commercially available hardware. Transparent renderings of large enclosing tissue (such as the skin) allow an unobstructed view of deeper structures while providing a three-dimensional context for the user as described in the "Texture Mapping" application referenced in the "Cross Reference to Related Applications" above.
2. Stereo—Stereoscopic viewing may be used to enhance the perception of three dimensional relationships. This requires two separate images to be provided to operator 5: one corresponding to the left eye view and one corresponding to the right eye view.
3. Split screen—Two views are simultaneously displayed by renderer 29 on display 39. One image is from a viewpoint selected by operator 5 that serves as an overall reference view of subject 3 which acts as a map. The second image is from a viewpoint within the cavity.
4. Where am I?—While displaying images from viewpoints moving along the generated viewpoint path, operator 5 may press a "Where am I?" button on graphical interface 31 that causes the current internal image to change to an overview image with a symbol showing the location of internal viewpoint of the previous internal image.
5. Camera tracking on cross-sectional slices—Another window on display 39 created by renderer 29 shows the current viewpoint marked by a symbol on the original CT or MRI slices acquired by acquisition unit 21. This allows localization with reference to familiar cross-sectional images.

Experimental Results

The virtual cavity inspection system was tested on regions of a living subject.

Figure 4:
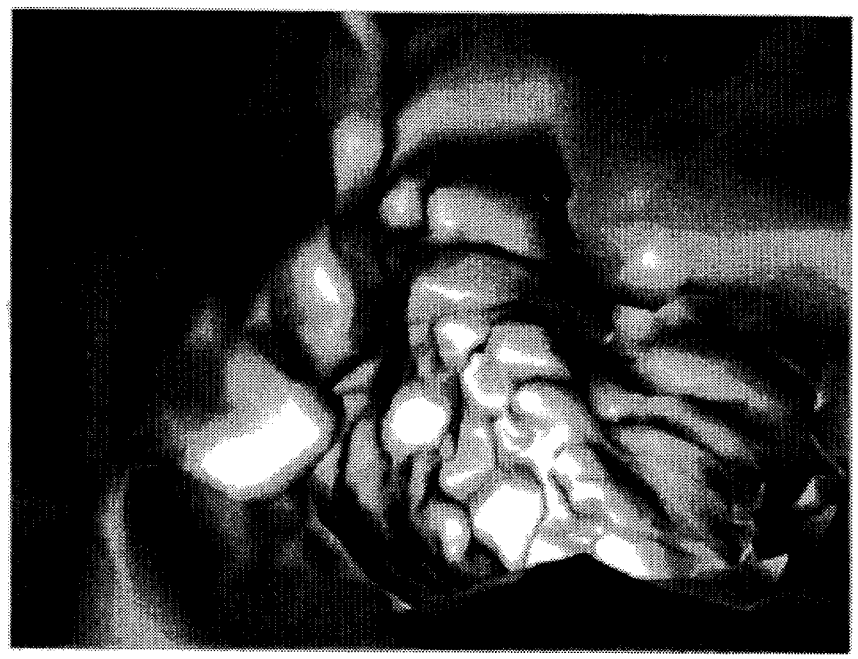
FIG. 4 is computer generated view of the inside of a colon of a subject.

In FIG. 4, an X-ray computed tomography ("CT") device was employed as acquisition unit 21 to acquire image information of internal structures of subject 3. Surface extractor 25 extracted a surface described by 60,000 triangles. The view of FIG. 4 is from a viewpoint along a viewpoint path through the colon. Selecting the viewpoint in this manner simulates conventional endoscopy.

Figure 5:
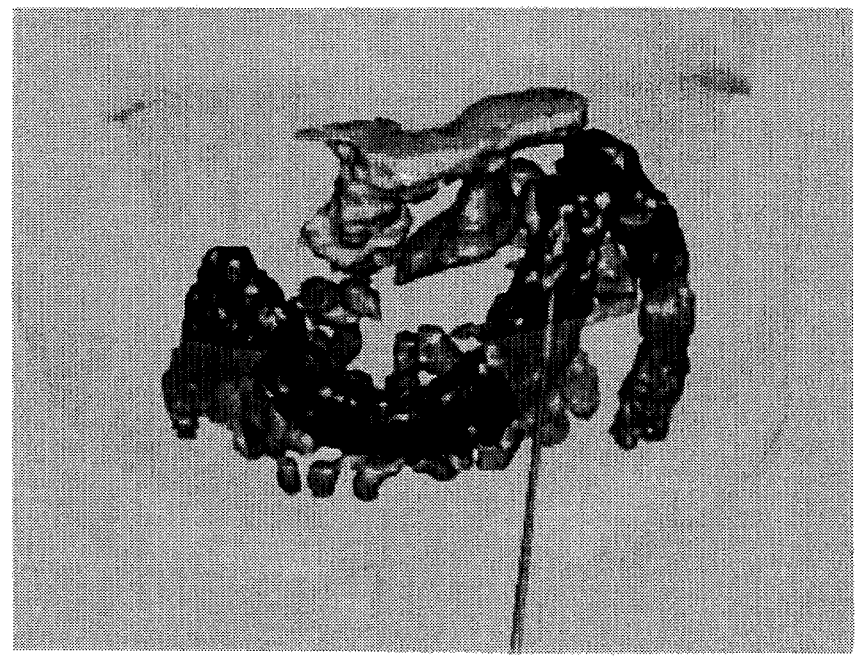
FIG. 5 is an overall 'map image' created with a cylinder symbol indicating the viewpoint of the image of FIG. 4.

FIG. 5 illustrates an enlarged overall view of the colon, a 'map' image, with a cylinder used as a symbol to illustrate the viewpoint used in creating the image of FIG. 4. This 'map' image may be simultaneously created by renderer 29 and displayed on display 39, to allow localization of the simulated endoscopic view of FIG. 4.

The present invention was also employed a living subject's cranium, brain vessels and aorta, all providing excellent images. The present invention provides increased visualization of medically important structures such as plaque in blood vessels, polyps in the gastro-intestinal tract non-invasively, to lead to early detection and treatment of potentially serious diseases.

The present invention may also be employed to non-living, or inanimate subjects. All that is required is imaging information of its internal structures. These may be acquired as described above, or synthesized by CAD/CAM methods.

The imaging information may be provided in various forms and not require all of the processing as set forth above. For example, the imaging information may already provided as segmented information, and therefore, segmentation unit 23 is not required. Similarly, if the imaging information is provided as surfaces, the surface extractor 25 is not required. Also, the surfaces may already be decimated, thereby eliminating decimator 27.

The internal views produced by the present invention simulate the types of views that can be obtained with cavity inspection devices, such as endoscopes. Compared with real endoscopic views, the present invention has the following advantages:
1. Interactive control of all virtual camera parameters including the field-of-view;
2. ability to pass through the walls of the organ to view neighboring anatomy;
3. ability to localize the 3D position of the viewpoint of an internal image cavity;
4. user controlled movement along a computer generated path; and
5. an infinite depth of field.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What we claim is:
1. A method of simulating endoscopy comprising the steps of:
   a) acquiring image information of internal structures of a subject;
   b) creating a three-dimensional (3D) surface model of the image information;
   c) selecting a start viewpoint in an internal cavity;
   d) selecting a goal viewpoint in the internal cavity;
   e) calculating a viewpoint path around obstacles linking the start point and the goal point by:
      i. calculating a distance, passing around obstacles as a wavefront would travel, from each voxel of the surface model to the goal viewpoint,
      ii. labeling each voxel with its calculated distance,
      iii. setting a voxel containing the start point as the current voxel,
      iv. adding the current voxel to the viewpoint path,
      v. determining a voxel adjacent the current voxel having the lowest labeled distance value,
      vi. setting the voxel with the lowest labeled distance value to the current voxel, and
      vii. repeating steps "iv"–"vi" until a voxel containing the goal viewpoint is reached;
   f) creating a plurality of internal images having viewpoints along the viewpoint path; and g) displaying the images in sequential fashion according to position along the viewpoint path thereby simulating endoscopy.

2. The method of claim 1 wherein the step of calculating a viewpoint path comprises the steps of:

a) displaying to an operator images of the 3D model;
  b) interacting with the operator to select viewpoints between the start and goal viewpoints, being keyframes, which the viewpoint path is to pass through; and
  c) fitting the start viewpoint, the goal viewpoint and intermediate keyframes into a smoothed viewpoint path.

3. The method of claim 1 further comprising the steps of:

a) selecting a viewpoint outside of the viewpoint path;
  b) producing another image with a field-of-view substantially larger than the internal images produced with a viewpoint along the viewpoint path to act as a 'map image';
  c) displaying an arbitrary symbol on the map image indicating the viewpoint being used to create the currently displayed internal image.

4. The method of claim 1 further comprising the steps of:

a) producing cross-sectional image from the image information of internal structures of the subject having a field-of-view substantially larger than the internal images produced with a viewpoint along the viewpoint path to act as a 'map image'; and
  b) displaying an arbitrary symbol on the cross-sectional image indicating the viewpoint being used to create the currently displayed internal image.

5. The method of claim 1 wherein:

a) a plurality of stereoscopic pairs of internal images are created having viewpoints along the viewpoint path; and
  b) the stereoscopic pairs are provided to the operator in a sequential fashion according to position along the viewpoint path thereby simulating stereoscopic endoscopy.

6. A virtual inspection system for viewing internal cavities of a subject comprising:

a) a memory for storing image information;
  b) a three-dimensional (3D) model display means coupled to the memory for displaying the image information stored in the memory as viewed from selected viewpoints along a viewpoint path;
  c) a graphical interface for interacting with an operator to define start and goal viewpoints within an internal cavity;
  d) navigation volume calculation unit coupled to the memory for determining distances around obstacles as a wavefront would propagate, from each voxel through said cavity to the goal viewpoint and for creating a navigation volume having voxels each labeled with its corresponding distance;
  e) a path calculation unit coupled to the memory for determining a shortest distance around obstacles between the start viewpoint and the goal viewpoint being the viewpoint path, and storing this path in the memory allowing the 3D model display means to create a series of images as viewed from points along this calculated viewpoint path.

7. The virtual inspection system of claim 6 further comprising a path smoothing unit coupled to the memory for smoothing the viewpoint path before the 3D model display means creates the series of images.

* * * * *